United States Patent

Kobayashi

[11] Patent Number: 6,113,874
[45] Date of Patent: Sep. 5, 2000

[54] THERMOCHEMICAL REGENERATIVE HEAT RECOVERY PROCESS

[75] Inventor: Hisashi Kobayashi, Putnam Valley, N.Y.

[73] Assignee: Praxair Technology, Inc., Danbury, Conn.

[21] Appl. No.: 09/069,161

[22] Filed: Apr. 29, 1998

[51] Int. Cl.[7] .............................. C07C 1/02; C07C 4/02; C01B 3/02; C01B 3/26; C01B 31/18

[52] U.S. Cl. .................. 423/650; 252/373; 423/418.2; 423/437.1; 423/648.1; 423/651; 423/652; 423/659; 423/DIG. 6; 423/DIG. 9; 585/648; 585/653; 585/752

[58] Field of Search ..................... 423/418.2, 437.1, 423/650, 652, 655, 656, 651, 659, 648.1, DIG. 6, DIG. 9; 252/373; 585/752, 648, 653

[56] References Cited

U.S. PATENT DOCUMENTS

| | | | |
|---|---|---|---|
| 4,900,333 | 2/1990 | Bos | 48/197 |
| 5,453,259 | 9/1995 | D'Souza | 423/245.1 |
| 5,595,059 | 1/1997 | Huber et al. | 60/39.02 |
| 5,714,132 | 2/1998 | Kapoor et al. | 423/418.2 |

FOREIGN PATENT DOCUMENTS 740634   11/1955   United Kingdom ............ 423/651

OTHER PUBLICATIONS

"Regenerative Ceramic Burner Technology and Utilization", Industrial Heating—Nov., 1988.

Primary Examiner—Steven P. Griffin
Assistant Examiner—Maribel Medina
Attorney, Agent, or Firm—Donald T. Black

[57] ABSTRACT

A furnace is provided having at least two regenerator beds for heat recovery. While a first bed is being heated by hot flue gases produced by combusting a fuel and an oxidant in the furnace, a second bed, heated during a previous cycle, is cooled through carrying out an endothermic chemical reaction therein, for example the reforming reaction of a hydrocarbon with water vapor and carbon dioxide and/or the dissociation of a hydrocarbon. Once the second bed is cooled by the endothermic reaction, the hot flue gases are redirected to it while the first bed, now hot, is used for carrying out the endothermic chemical reaction. Thereafter the cycle is repeated.

24 Claims, 2 Drawing Sheets

THERMOCHEMICAL REGENERATIVE HEAT RECOVERY PROCESS

TECHNICAL FIELD

The invention relates generally to the recovery of flue gas waste energy in furnaces employing regenerator beds.

BACKGROUND ART

A significant amount of energy is wasted when hot products of combustion generated in industrial furnaces are vented as flue or exhaust gases. A number of techniques have been developed to recover at least part of this waste energy.

Regenerators, for example, provide a cyclic heat interchange, alternatively receiving heat from outgoing hot gaseous products of combustion and transferring it to, and thus preheating, the incoming combustion air. Typically, regenerators have a heat reclamation bed made of or filled with a packing material that stores and transfers heat. While large checkerwork refractory regenerators have been known for decades, a more recent development has been the introduction of integral burner-regenerators, also known as regenerative burners.

In general, regenerative burners are provided in pairs, with one unit operating in a combustion mode and the other in an exhaust or flue mode. For twin units A and B, for example, unit B may be operated as a burner while hot flue gases are cooled by being passed through the bed of unit A which is operated as "flue". When the bed of unit A has reached the targeted temperature, the flue gases are redirected to the bed of unit B, now operating as flue, while unit A is switched to burner mode; heat stored in the bed of unit A is recovered as the combustion air at ambient temperature is passed through the hot bed and is preheated. Once the bed of unit B reaches the targeted temperature, unit B is again switched to burner mode while hot exhaust gases are redirected to unit A.

Although it is known to recover waste energy from hot flue gases by preheating incoming combustion air, this preheating approach is not normally practiced in oxygen-based combustion processes where the oxidant is typically employed at ambient temperature. One reason is that the energy savings expected from preheating oxygen are modest. Moreover, there are a number of technical difficulties associated with handling hot combustion oxygen. Although oxygen may be preheated using indirect heat exchangers or recuperators, such units have limitations imposed by the materials employed in their construction; generally, the oxygen preheat temperature that can be reached in such heat exchangers does not exceed about 1300° F.

Problems also exist with the attempt to preheat oxygen using the rapid cycle regenerators currently available for air-fired furnaces. For example, the beds of these regenerator systems become plugged when the flue gases contain dust and/or condensables; consequently their use is limited to relatively clean processes.

Since the typical cycle time of a rapid cycle regenerator is less than 2 minutes, the size of the beds in these units is small. In the case of oxygen preheating, for a flue gas temperature of about 2400° F., flue gases exiting the regenerator remain at an excessively high temperature, about 1500° F., as compared to only about 300° F. for preheating air. Moreover, the volume of residual oxygen left in the regenerator at the end of the preheating cycle may be as high as 5% to 10% of the oxygen flow volume per preheating cycle. When the flow is reversed, this residual oxygen is lost in the exhaust. Generating increased amounts of $NO_x$ by combusting high temperature oxygen is yet another technical problem that may arise from oxygen preheating.

Clearly, the special characteristics of oxy-fuel combustion impose limitations on the possible approaches to heat recovery, limitations that are not encountered in conventional processes where preheating the combustion air is cost effective, well understood and widely practiced.

Accordingly, it an object of the invention to provide a process for improving the recovery of waste energy from hot flue gases produced in furnaces employing regenerative beds.

It is another object of the invention to provide a process for improving the recovery of waste energy from hot flue gases produced during the combustion of a fuel with an oxidant having an oxygen concentration higher than that of air.

SUMMARY OF THE INVENTION

The above and other objects, which will become apparent to one skilled in the art upon a reading of this disclosure, are attained by the present invention which is:

A process for recovering heat from hot flue gases produced by combusting a fuel with an oxidant in a furnace comprising:

(A) passing hot flue gases from the furnace through a cooled first regenerator bed, thereby heating the first regenerator bed and producing cooled flue gases, while passing reactants through a heated second regenerator bed and reacting the reactants in the second regenerator bed in an endothermic chemical reaction, thereby generating reaction products and cooling the second regenerator bed; followed by (B) passing hot flue gases from the furnace through the cooled second regenerator bed, thereby heating the second regenerator bed and producing cooled flue gases, while passing reactants through the heated first regenerator bed and reacting the reactants in the first regenerator bed in an endothermic chemical reaction, thereby generating reaction products and cooling the first regenerator bed.

DETAILED DESCRIPTION OF THE INVENTION

Figure 1:
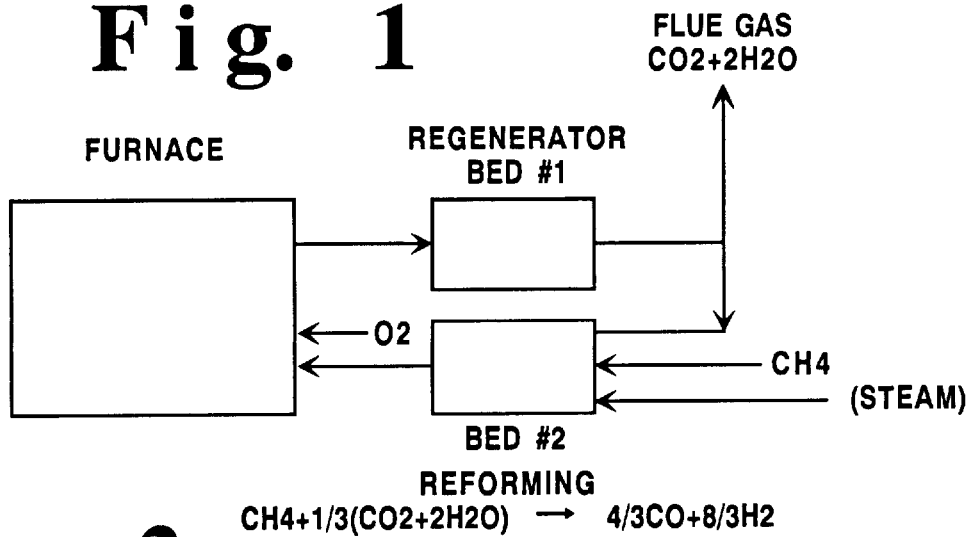
FIG. 1 is a schematic diagram of a system useful for carrying out the invention.

In many furnaces fuel is combusted in the presence of an oxidant such as air, oxygen or oxygen enriched air, to heat the material being processed; hot waste flue gases containing hot products of combustion are generated during the operation of these furnaces. The invention is particularly advantageous for use with furnaces heated by combusting a fuel with oxygen but can also be advantageous when used with conventional air-fired furnaces or in furnaces fired with oxygen-enriched air.

The invention is used with furnaces employing at least one regenerator system, each system typically having two regenerator beds although more than two beds may be used. The beds typically comprise a refractory-lined container packed with a material that is effective in storing and transferring heat, can provide adequate thermal shock resistance and can withstand the temperatures and pressure drops encountered in practicing the invention. Balls made of various metals, alumina, magnesia, mullite, AZS or zirconia-based ceramics are examples of the material that can be used in the regenerator beds.

In the practice of this invention, the regenerator beds are employed, not merely as heat interchangers, but also for carrying out one or more endothermic chemical reactions thereby generating useful reaction products. The sensible heat from hot flue gases produced in the combustion process is captured and stored in a regenerator bed material during one cycle and during the subsequent cycle, the bed acts as a thermochemical regenerator whereby a portion of the heat stored in the regenerator bed is recovered as endothermic heat for the reaction.

For a regenerator system with first and second beds numbered #1 and #2, hot flue gases formed during the combustion process are passed through bed #1 heating the bed material and cooling the flue gases, while the desired reactants are passed through bed #2 already heated during the previous cycle. As the endothermic reaction takes place, reaction products are formed and bed #2, acting during this cycle as a thermochemical regenerator, is cooled. The flows to the beds are then switched, with bed #2, now cold, providing a heat sink for the hot flue gases and hot bed #1 supplying to the reactants the heat of reaction necessary to form reaction products by the endothermic chemical reaction.

Since flue gases contain products of combustion such as carbon dioxide and water vapor and since typically the fuel used in the combustion process contains methane and/or other hydrocarbons, it is particularly beneficial to take advantage of the presence of these species to carry out the reforming reaction(s) discussed below.

In accord with this embodiment of the invention, sensible heat from hot flue gases is captured and stored in bed #1. At least a portion of the cooled flue gases exhausted from bed #1 and containing products of combustion, $CO_2$ and $H_2O$, is recycled and injected, along with hydrocarbons, such as those typically found in the combustion fuel, into bed #2, which had been heated during the previous cycle. Steam may also be provided into bed #2. The reactants are heated by the bed and react endothermically thus recovering heat stored in bed #2. Once bed #1 is heated by the hot flue gases and bed #2 cooled by the endothermic reforming reaction, the flows to the beds are reversed and the heat recovery continues in cyclic fashion.

In addition to the steps described above, it may be desirable to purge the bed of the residual gas left in the bed at the end of the endothermic reaction cycle. Cooled recycled flue gas or steam may be used as the purging medium.

By using a combustion oxidant having an oxygen concentration higher than that of air and, preferably, gby using pure or nearly pure oxygen, the concentration of $H_2O$ and $CO_2$ in the flue gases is considerably higher than would be the case if air were used since these species would be diluted by large amounts of nitrogen. In addition, oxygen-based combustion processes generate higher temperatures. Both of these factors promote the reforming reaction(s).

Accordingly, it is a preferred embodiment of the invention to carry out the combustion process using an oxidant having an oxygen concentration higher than that of air. For example, the oxidant may be oxygen enriched air and have an oxygen content higher than 21% by volume, preferably higher than about 35% by volume; it is most preferred to carry out the combustion process using an oxidant having an oxygen concentration of at least 80% by volume. The oxidant may be oxygen obtained through the cryogenic or non-cryogenic separation of air or through an oxygen-producing chemical process.

Preferably the thermochemical regenerator is heated to a temperature of at least 1500° F. Where relatively clean flue gases are generated, a suitable catalyst can be used in the beds thus lowering the reforming temperature. Such catalyst include alumina, nickel or noble metal components. Catalytically active compounds may be supported on a ceramic catalyst carrier such as, for example, alumina.

In idealized form, the reaction taking place in the reforming bed can be written as:

$$CH_4 + 2/3 H_2O + 1/3 CO_2 \rightarrow 4/3 CO + 8/3 H_2 \tag{1}$$

The reaction is endothermic and at 60° F. requires 250 Btu per 1 standard ft³ (SCF) of $CH_4$, measured at 60° F. The product of this reaction, i.e. carbon monoxide and hydrogen, known as synthesis gas or syngas, can be used further. It is a preferred embodiment of the invention to pass the reactant product mixture of CO and $H_2$ into the furnace and combust it with oxygen to produce $CO_2$ and $H_2O$. This arrangement is shown in FIG. 1.

Reforming is not the only endothermic reaction that can be carried out in the regenerator bed. In Table 1 there are listed heats of reaction for some examples of combustion, partial oxidation, reforming and dissociation or cracking reactions. Table 2 shows the sensible heat of various gases or gas mixtures per SCF of $CH_4$ at three different temperatures: 1300, 2000 and 2400° F.

TABLE 1

| HEAT OF COMBUSTION AND REFORMING REACTIONS | |
|---|---|
| | (BTU/SCF @60° F.) |
| HEAT OF REACTION | |
| $CH_4$ + 2O2 -> CO2 + 2H2O(g) | 913 |
| $H_2$ + 1/2O2 -> H2O(g) | 275 |
| CO + 1/2O2 -> CO2 | 322 |
| C + O2 -> CO2 | 446 |
| POX/REFORMING REACTIONS | |
| $CH_4$ + 1/2O2 -> CO + 2H2 | 41 |
| $CH_4$ + H2O -> CO + 3H2 | −234 |
| $CH_4$ + CO2 -> 2CO + 2H2 | −281 |
| $CH_4$ + 1/3CO2 + 2/3H2O -> 4/3CO + 8/3H2 | −250 |
| CRACKING REACTION | |
| $CH_4$ -> C + 2H2 | −83 |

TABLE 2

SENSIBLE HEAT OF GASES (BTU/SCF OF CH4) @

| GAS TEMPERATURE (F) | 1300 | 2000 | 2400 |
|---|---|---|---|
| SENSIBLE HEAT PER 1 SCF OF CH4 | | | |
| FLUE GAS (O2-CH4): CO2 + H2O (g) | 93 | 156 | 193 |
| FLUE GAS (AIR-CH4): CO2 + 2H2O(g) + 8N2 | 278 | 459 | 569 |
| OXYGEN | 49 | 81 | 99 |
| AIR | 223 | 367 | 453 |
| CH4 | 41 | 76 | 97 |
| REFORMED GAS (O2): 4/3CO + 8/3H2 | 91 | 147 | 181 |
| REFORMED GAS (AIR): 4/3CO + 8/3H2 = 8/3N2 | 153 | 249 | 307 |
| POX PRODUCTS:(CO + 2H2) | 68 | 110 | 136 |

TABLE 3

THEORETICAL HEAT RECOVERY RATIO

| FLUE GAS TEMPERATURE (F) | 2000 | 2400 | 2800 |
|---|---|---|---|
| GAS PREHEAT TEMPERATURE (F) | 1300 | 2000 | 2400 |
| OXY-FUEL COMBUSTION | | | |
| (1) OXYGEN PREHEAT | 0.32 | 0.42 | 0.43 |
| (2) CH4 PREHEAT | 0.27 | 0.42 | 0.42 |
| (3) O2/CH4 PREHEAT | 0.59 | 0.81 | 0.85 |
| (4) 100% CH4 REFORMING | 1.64 | 1.54 | 1.39 |
| (5) 50% CH4 REFORMING | 0.94 | 0.88 | 0.8 |
| AIR-FUEL COMBUSTION | | | |
| (1) AIR PREHEAT | 0.61 | 0.81 | 0.84 |
| (2) CH4 PREHEAT | 0.09 | 0.13 | 0.14 |
| (3) AIR/CH4 PREHEAT | 0.7 | 0.94 | 0.98 |
| (4) 100% CH4 REFORMING | 0.66 | 0.66 | 0.61 |

As seen in Table 1, the heat of combustion produces 913 Btu per 1 SCF of $CH_4$ at 60° F. The reforming reaction is endothermic and requires about ¼ of the heat of combustion at 60° F., thus presenting the potential to recover a significant amount of waste heat. Cracking to form carbon and hydrogen is also endothermic and requires about 83 Btu/SCF at 60° F.

As shown in Table 2, the sensible heat of flue gases at a temperature of 2400° F., produced by oxy-fuel combustion, is 193 Btu/SCF or about 22% of the heat of combustion; for air-based combustion, the sensible heat of the flue gases at 2400° F. is 569 Btu/SCF or about 60% of the heat of combustion.

Theoretical heat recovery ratios are shown in Table 3 at three temperatures and at various heat recovery options: (1) oxidant preheating; (2) fuel preheating; (3) oxidant and fuel preheating; reforming for (4) 100% $CH_4$ and (5) 50% $CH_4$. The table highlights the differences between oxy-fuel and air-based combustion with respect to waste heat recoverable by preheating the oxidant. While in conventional air-based combustion as much as 61 to 84% of the sensible heat of flue gases can be recovered by preheating the combustion air, only about 32 to 43% can be recovered by preheating oxygen in the oxy-fuel case; this is due to the small volume and low heat capacity of oxygen compared to the flue gases.

While preheating is less attractive for oxy-fuel combustion when compared to the air-based process, Table 3 illustrates that reforming can greatly increase the energy recovery for the oxygen case. As seen in Table 1, the endothermic heat of reaction for reaction (1) is 250 Btu/SCF $CH_4$ at 60° F. In addition, as seen in Table 2, the reformed gas (syngas) at 2000° F., for instance, also has 147 Btu/SCF $CH_4$ of sensible heat. Thus fully reforming a cold mixture of $CH_4$ and flue gas ($CO_2$ and $H_2O$) requires a total of 397 Btu/SCF $CH_4$ for the 2000° F. gas temperature. For a 1:1 flue gas to $CH_4$ initial ratio and a 33% recycle of flue gas, 133% of the original flue gas is available to the regenerators. For flue gases at a temperature of 2400° F., the sensible heat of the flue gases per 1 SCF of $CH_4$ is 193 (from Table 2) multiplied by 133% or 257 Btu/SCF of $CH_4$. Table 3 shows that for this case the theoretical heat recovery ratio is 397/257 or 1.54. Heat recovery ratios greater than 1 indicate that the potential energy capacity of the thermochemical regenerator is greater than the amount of sensible heat available in the flue gases. Consequently, it is not necessary to use 100% of the available fuel for reforming and Table 3 shows a very favorable theoretical heat recovery ratio, ranging between 0.8 and 0.94, with only 50% fuel usage.

As discussed above, reforming is favored by high temperatures. Generally, in the absence of catalysts, no reforming reaction takes place once the bed temperature drops below about 1300° F. In order to further recover the residual energy still stored in the bed, once the bed temperature becomes too low to maintain the reforming reaction, the combustion gases can be preheated by passing them through the partially cooled bed. According to one embodiment of the invention, additional energy can be recovered by the sequential preheating of fuel ($CH_4$) and then of oxygen by passing them through the bed after the bed temperature is too low for the reforming reaction to occur.

Although it will be recognized that the use of a catalyst, the catalyst type and the bed design will all affect the temperature of the reforming reaction, the example below assumes that the bed temperature at the end of the reforming reaction is about 1300° F. For fuel preheating, the sensible heat of flue gases (with recycling of 33%) at this bed temperature is 123 Btu per SCF of natural gas (mostly $CH_4$) and is approximately equal to the energy stored in the bed at 1300° F. For an initial ratio of 1:1 $CH_4$ to flue gas with 33% recycling of flue gases, the sensible heat possible for the $CH_4$-flue gas mixture is 41+(93×33%) or a total of 72 Btu/SCF CH4. Thus 51 Btu of energy cannot be recovered and the bed is left at a temperature of about 750° F.

Figure 2:
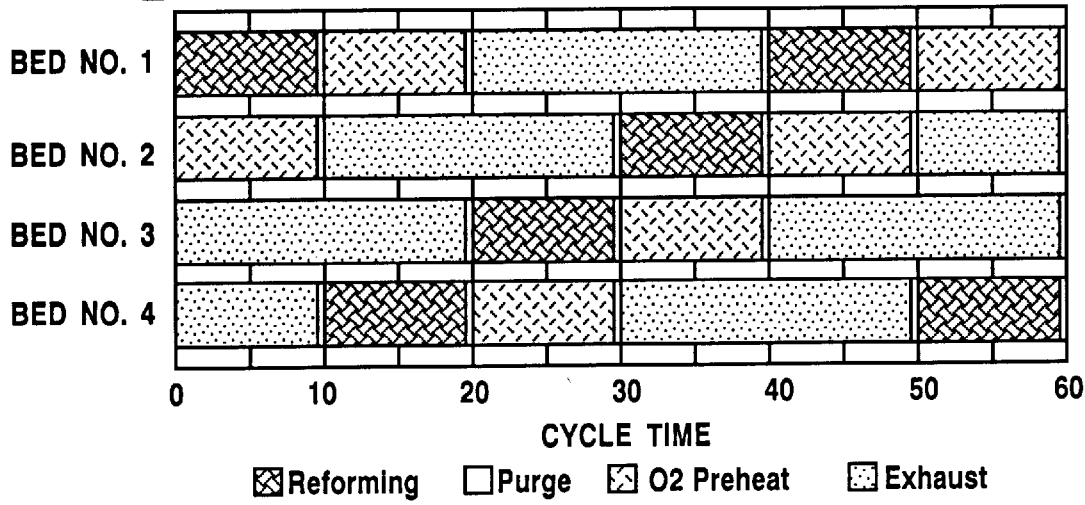
FIG. 2 is a graphical representation of the operation of a system having four beds showing oxygen sequential reforming and oxygen preheating.

The residual heat in the bed (at about 750° F.) can be recovered by preheating the combustion oxygen. FIG. 2 illustrates a regenerative arrangement with flue gas recycle and a sequential oxygen preheating step in the same bed.

An additional advantage of passing an oxidizing gas such as oxygen through the bed sequentially is its role in cleaning carbon deposits formed in the bed through fuel cracking. It is not necessary to use high purity oxygen for burning out carbon deposits. In fact an oxidizing gas such as a mixture of oxygen and recycled flue gas may be preferred since it can prevent excessive high local temperatures that could be caused by the reactions of carbon deposit and high purity oxygen. Because of this burn-out cleaning cycle with oxygen, it is even possible to preheat and partly crack the natural gas fuel in the regenerator bed without mixing in recycled flue gases.

Since a typical furnace has multiple regenerative burners, it may be advantageous to have conventional as well as thermochemical regenerative burners in the same furnace. According to another embodiment of the invention, oxygen may be preheated in conventional regenerators while the mixture of fuel and recycled flue gas is preheated in the thermochemical regenerators. In this parallel oxygen/thermochemical regenerator arrangement, flue gases are divided and exhausted through the regenerator beds so as to recover some of the heat by oxygen preheating and the balance by an endothermic chemical reaction such as reforming.

The optimal amount to be directed to the conventional oxygen preheating regenerator can be illustrated through the following example in which the flue gases are assumed to be at a temperature of 2400° F. The sensible heat contained in 100% and 40% of hot flue gas obtained by stoichiometrically combusting $CH_4$ and technically pure oxygen is, respectively, 193 and 77 Btu per 1 SCF of $CH_4$. The sensible heat of technically pure oxygen at 1900° F. is also 77 Btu per 1 SCF of CH 4. Thus, to preheat the oxygen to 1900° F., only about 40% of the original flue gas volume needs to be directed to the conventional regenerator bed used for preheating the oxygen.

Figure 3:
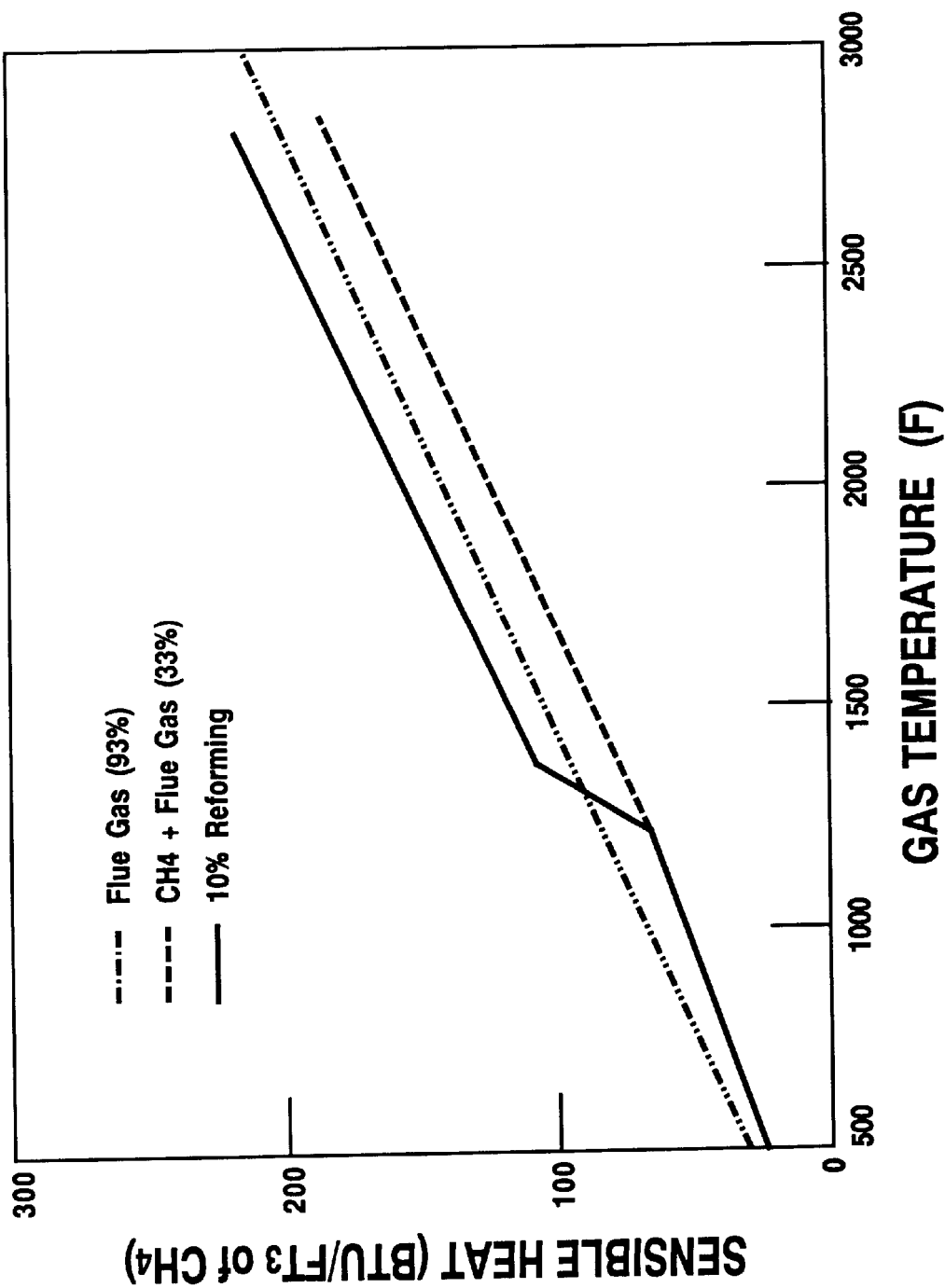
FIG. 3 graphically illustrates the energy recovery obtained by preheating a thermochemical regenerator with 93% of flue gases and reforming 10% of the natural gas fuel.

The remaining 93% (assuming 33% recycle resulting in 133% of the original flue gas volume) is available to preheat other furnace beds, for example the bed to be used to carry out the reforming reaction. If the heated thermochemical regenerator bed then receives 100% of the natural gas ($CH_4$) and 33% of the cooled flue gases, only 10% of the natural gas needs to be reformed in order to achieve a heat recovery ratio of 1. The energy recovery obtained in this embodiment of the invention is illustrated in FIG. 3.

Figure 4:
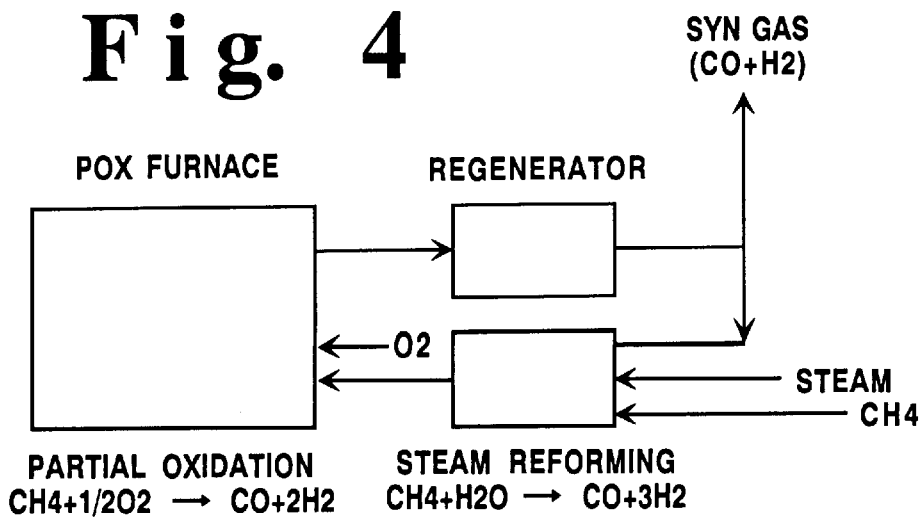
FIG. 4 is a schematic diagram of a system useful for carrying out the invention in which a thermochemical regenerator is integrated with a furnace generating partial oxidation products.

The invention can be practiced in conjunction with a generating partial oxidation (POX) combustion products and this arrangement is shown in FIG. 4. In such a POX furnace, fuel is partially oxidized to produce CO and $H_2$ along with some $CO_2$ and $H_2O$. Oxygen and steam are used to oxidize the fuel and control the formation of soot. According to this arrangement, hot products of the partial oxidation in the furnace are passed to bed #1 thereby heating the bed. Meanwhile, a mixture of steam and $CH_4$ is fed to bed #2, heated during the previous cycle, to recover heat and partly produce $H_2$ and CO gases which are introduced in the furnace along with oxygen. The consumption of oxygen is reduced due to the better overall thermal efficiency which allows more $H_2O$ to react with $CH_4$. As in other embodiments discussed above, the flows to the beds are cyclically switched back and forth.

In addition to the arrangements and theoretical energy recovery evaluations discussed above, there are several practical considerations as well as a number of advantages that are associated with the invention. For example, as shown in the tables, a number of endothermic chemical reactions can take place in the reforming bed, including cracking. Optimal heat recovery is expected to depend on the temperature and recycle ratios of the flue gases, on the bed packing material and the possible use of a suitable reforming catalyst.

The amount of fouling with carbon deposits onto the bed packing material may be minimized by increasing the flue gas to fuel (natural gas) ratio, or by adding steam. The desirable range of flue gas recycle (flue gas/natural gas volume ratio) is from about 0.5 to about 3, preferably from about 1 to about 2. Another approach is the mixing in of steam or the use of a sequential oxygen preheating in the thermochemical regenerator. As noted above, one advantage of oxygen preheating is its cleaning effect as the mixture of oxygen and flue gases burns off carbon deposits formed in the bed during the reforming cycle.

When compared to conventional air-based regenerative furnaces, the oxy-fuel thermochemical regenerative system disclosed herein is better suited to tolerate cold air infiltration.

With the invention, air infiltration increases the flue gas volume and reduces the amount of oxygen required in the oxy-fuel thermochemical regenerative system of the invention. The additional heat lost through the increase in the sensible heat of flue gas can be recovered as thermochemical energy. Thus practicing the invention results in less severe penalties with air infiltration with respect to energy efficiency than the conventional regenerative air-based furnace. Thus it is possible to operate the furnace thermally efficiently at slightly less than the atmospheric pressure and allowing some air infiltration to occur.

For achieving low $NO_x$ emissions in carrying out the invention, it is preferred that the invention be practiced using the combustion method disclosed in U.S. Pat. No. 5,076,779.

To keep the bed size small, it is preferred to use rapid cycle regenerators. However, for recovering heat from flue gases containing particulates and/or condensable vapors, the gas passages in the regenerator beds must be large enough to prevent plugging problems. For example, the commercial regenerators used for glass melting furnaces typically reverse every 20 to 30 minutes and the average diameter of the gas passages is several inches. The invention is advantageous in that it can be employed with both large and small regenerative units.

For a multi-burner installation, individual burners may be turned on and off in a staggered time sequence for more continuous firing of the furnace. As the firing rate requirement is decreased, the regenerator cycle can be lengthened, approximately inversely proportionally to the average firing rate of the furnace.

The following example is presented for illustrative purposes and is not intended to be limiting.

A batch type steel reheating furnace is fired with four natural gas and oxy-fuel burners at a total firing rate of 20 MMBtu/hr. 20,000 SCFH of natural gas and 41,300 SCFH of commercial grade oxygen, having an oxygen concentration of about 99.5%, are used for combustion without any flue gas heat recovery systems. The average flue gas temperature is 2400° F. Each of the four oxy-fuel burners are replaced with a low $NO_x$ oxy-fuel burner system of the type disclosed in U.S. Pat. No. 5,076,779 equipped with a two-bed thermochemical regenerator arrangement of this invention (i.e., total of eight beds). The bed material is made of ½ inch diameter alumina balls and heated to a maximum temperature of about 2200° F. at the end of the heating cycle. About 10% of flue gas from the furnace is continuously exhausted through a separate flue port or escapes through furnace openings. Each bed is sized to store 5,000 Btu of heat per 40 second regeneration cycle. Each bed has a fuel heating/reforming period of 19.5 seconds, a purge period of 0.5 second, a flue gas exhaust period of 19.5 seconds and a purge period of 0.5 second. A portion of cooled flue gas from the regenerators is recycled and mixed with fuel gas at a flue gas to fuel gas volume flow ratio of 1:1. The fuel and flue gas mixture is heated to an average temperature of about 2000° F. by the regenerator and a portion of the fuel is endothermically reformed in the bed. Flue gas temperature downstream of the bed is controlled to be less than 300° F. The average natural gas flow rate is reduced to 16,500 SCFH and the oxygen flow is reduced to 33,000 SCFH as a result of heat recovery. 16,500 SCFH of flue gas is continuously recycled from downstream of the regenerators in the exhaust cycle and fed to the regenerators in oxygen preheat and purge cycles. Fuel and oxygen savings of 17.5% each are achieved in this example of the invention.

Although the invention has been described in detail with reference to certain preferred embodiments, it will be appreciated by those skilled in the art that there are other embodiments within the spirit and scope of the claims.

What is claimed is:

1. A process for recovering heat from hot flue gases produced by combusting a fuel with an oxidant in a furnace comprising:

(A) passing hot flue gases from the furnace through a cooled first regenerator bed, thereby heating the first regenerator bed and producing cooled flue gases, while passing reactants comprising at least a portion of the cooled flue gases through a heated second regenerator bed and reacting the reactants in the second regenerator bed in an, endothermic chemical reaction, thereby generating reaction products and cooling the second regenerator bed; followed by (B) passing hot flue gases from the furnace through the cooled second regenerator bed; thereby heating the second regenerator bed and producing cooled flue gases, while passing reactants comprising at least a portion of the cooled flue gases through the heated first regenerator bed and reacting the reactants in the first regenerator bed in an endothermic chemical reaction, thereby generating reaction products and cooling the first regenerator bed.

2. The process of claim 1 wherein the oxidant has an oxygen concentration higher than that of air.

3. The process of claim 1 wherein the reactants comprise a hydrocarbon and water vapor.

4. The process of claim 1 wherein the endothermic chemical reaction is a reforming reaction.

5. The process of claim 1 wherein the endothermic chemical reaction is a dissociation reaction.

6. The process of claim 1 wherein the beds further contain a catalyst useful in promoting the endothermic chemical reaction.

7. The process of claim 1 wherein the reaction products comprise synthesis gas.

8. The process of claim 1 further comprising passing an oxidizing gas respectively through the first and second regenerator beds after conducting in the first and second regenerator beds the endothermic chemical reaction and before passing through the first and second regenerator beds hot flue gases from the furnace.

9. A process for recovering heat from hot flue gases produced by combusting a fuel with an oxidant in a furnace comprising:

(A) passing hot flue gases from the furnace through a cooled first regenerator bed, thereby heating the first regenerator bed and producing cooled flue gases, while passing reactants through a heated second regenerator bed and reacting the reactants in the second regenerator bed in an endothermic chemical reaction, thereby generating reaction products and cooling the second regenerator bed, and passing at least some of the reaction products to the furnace; followed by (B) passing hot flue gases from the furnace through the cooled second regenerator bed, thereby heating the second regenerator bed and producing cooled flue gases, while passing reactants through the heated first regenerator bed and reacting the reactants in the first regenerator bed in an endothermic chemical reaction, thereby generating reaction products and cooling the first regenerator bed, and passing at least some of the reaction products to the furnace.

10. The process of claim 9 wherein the oxidant has an oxygen concentration higher than that of air.

11. The process of claim 9 wherein the reactants comprise a hydrocarbon and water vapor.

12. The process of claim 9 wherein the endothermic chemical reaction is a reforming reaction.

13. The process of claim 9 wherein the endothermic chemical reaction is a dissociation reaction.

14. The process of claim 9 wherein the beds further contain a catalyst useful in promoting the endothermic chemical reaction.

15. The process of claim 9 wherein the reaction products comprise synthesis gas.

16. The process of claim 9 further comprising passing an oxidizing gas respectively through the first and second regenerator beds after conducting in the first and second regenerator beds the endothermic chemical reaction and before passing through the first and second regenerator beds hot flue gases from the furnace.

17. The process of claim 9 wherein the reactants passed through the heated second regenerator bed in step (A) and through the heated first regenerator bed in step (B) comprise at least a portion of the cooled flue gases.

18. The process of claim 17 wherein the oxidant has an oxygen concentration higher than that of air.

19. The process of claim 17 wherein the reactants comprise a hydrocarbon and water vapor.

20. The process of claim 17 wherein the endothermic chemical reaction is a reforming reaction.

21. The process of claim 17 wherein the endothermic chemical reaction is a dissociation reaction.

22. The process of claim 17 wherein the beds further contain a catalyst useful in promoting the endothermic chemical reaction.

23. The process of claim 17 wherein the reaction products comprise synthesis gas.

24. The process of claim 17 further comprising passing an oxidizing gas respectively through the first and second regenerator beds after conducting in the first and second regenerator beds the endothermic chemical reaction and before passing through the first and second regenerator beds hot flue gases from the furnace.

* * * * *